INVENTOR.
WILLIAM H. HARWOOD
BY
ATTORNEY

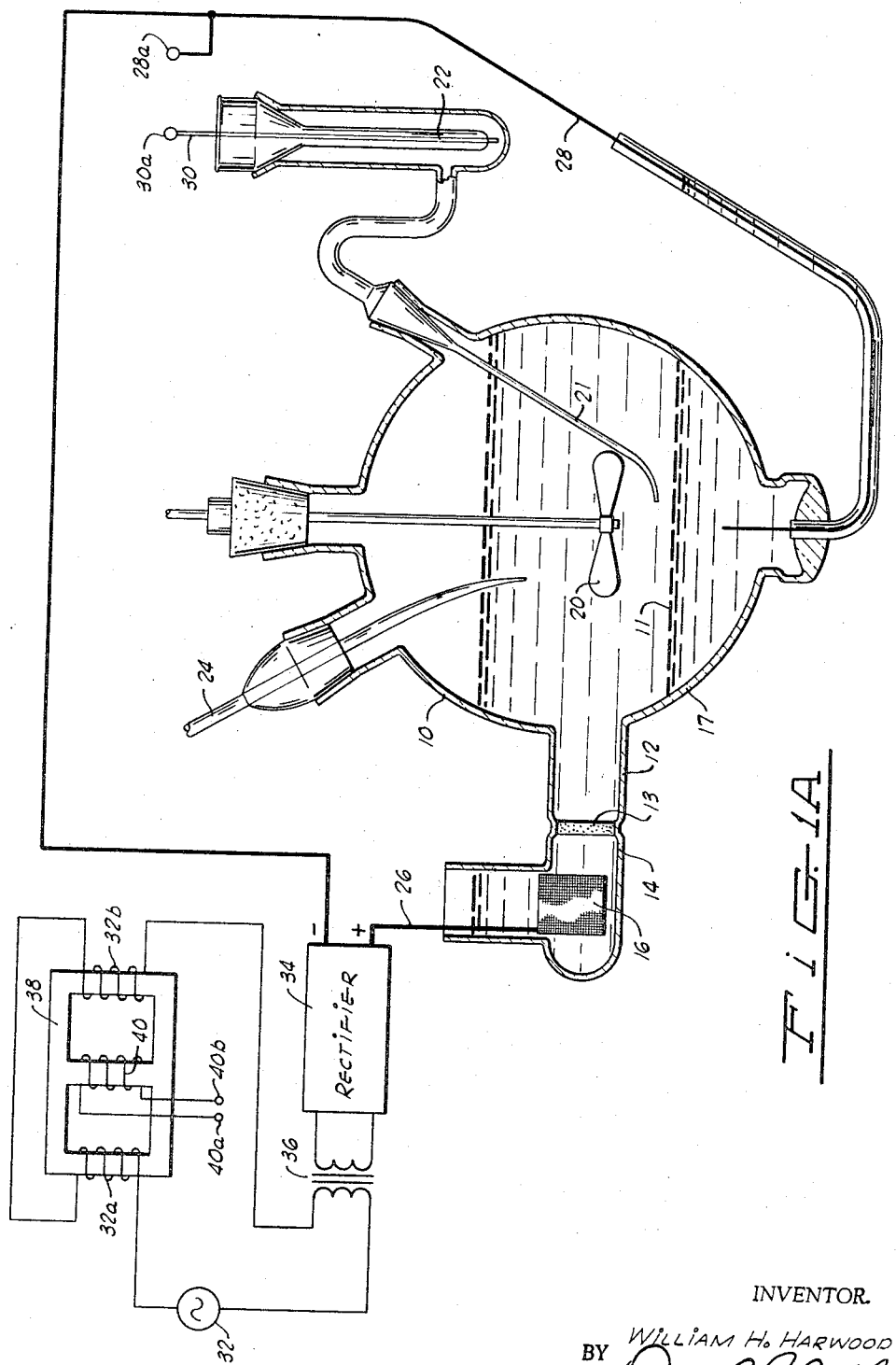

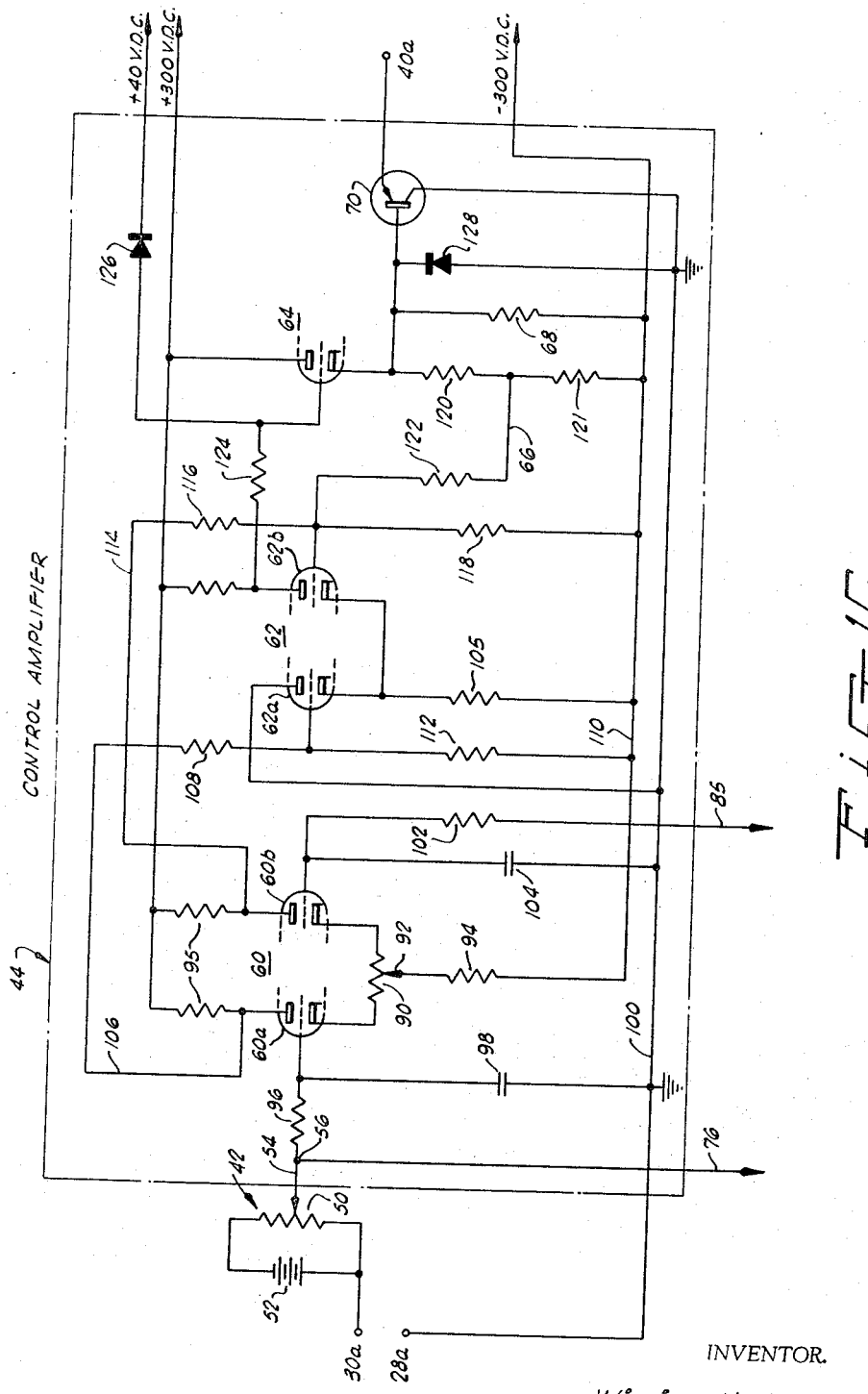

Aug. 29, 1967    W. H. HARWOOD    3,338,806
PROCESS OF PREPARING p-AMINOPHENOL BY ELECTROLYTICALLY REDUCING NITROBENZENE
Filed Oct. 4, 1963    8 Sheets—Sheet 5

PROCEDURE FOR ANALYSIS OF ELECTROLYSIS SOLUTION

CONTROLLED POTENTIAL REDUCTION OF NITROBENZENE

COMPARISON OF YIELD OF p-AMINOPHENOL, CONTROLLED VS UNCONTROLLED POTENTIAL

INVENTOR.
WILLIAM H. HARWOOD
BY David P. Cullen
ATTORNEY

CONTROLLED POTENTIAL REDUCTION OF NITROBENZENE

CONTROLLED POTENTIAL REDUCTION OF NITROBENZENE

CONTROLLED POTENTIAL REDUCTION OF NITROBENZENE

AMOUNT OF p-AMINOPHENOL PRODUCED
AT VARIOUS CONTROLLED POTENTIALS

INVENTOR.
WILLIAM H. HARWOOD
BY
ATTORNEY

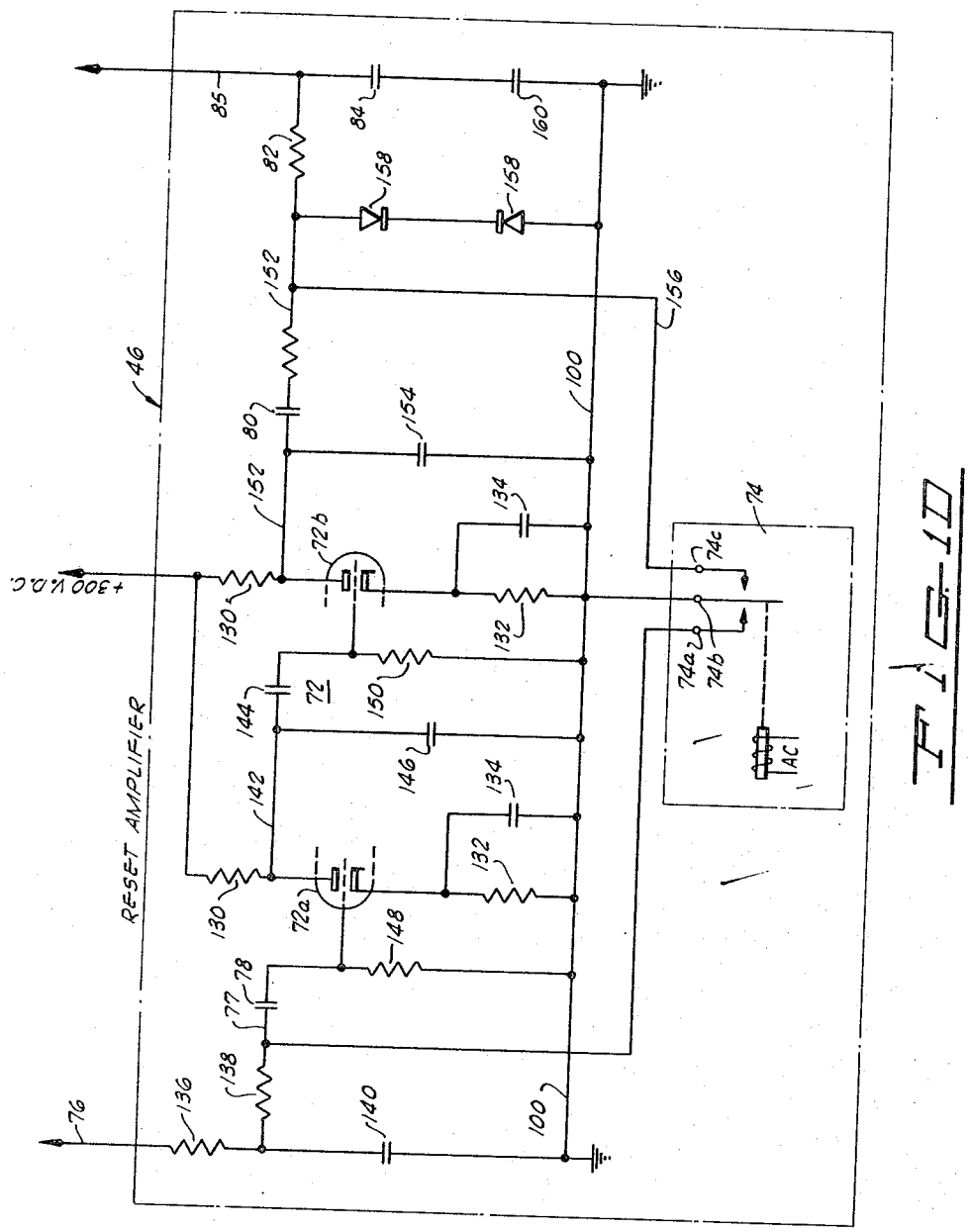

United States Patent Office 3,338,806
Patented Aug. 29, 1967

3,338,806
PROCESS OF PREPARING p-AMINOPHE-
NOL BY ELECTROLYTICALLY REDUC-
ING NITROBENZENE
William H. Harwood, Ponca City, Okla., assignor to Continental Oil Company, Ponca City, Okla., a corporation of Delaware
Filed Oct. 4, 1963, Ser. No. 313,813
5 Claims. (Cl. 204—74)

This is a continuation-in-part of my copending U.S. patent application Ser. No. 132,773, filed Aug. 21, 1961, and now abandoned entitled, "Controlled Potential Electrochemical Reactions."

This invention relates to a method and apparatus for carrying out organic electrochemical reactions. More particularly, but not by way of limitation, the invention relates to a method and apparatus for commercially producing relatively large quantities of substantially pure organic compounds by electrolytic oxidation and reduction reactions. In one of its more specific, but non-limiting aspects, the invention relates to a method for commercially producing one or more of the reduction products of nitrobenzene in good yields and relatively pure state.

In the late 19th century, Fritz Haber investigated the mechanisms of a number of organic electrochemical reactions and laid the foundation for methodically studying the parameters and conditions for carrying out and controlling such reactions. In 1898, Haber published a paper dealing with the step-wise electrolytic reduction of nitrobenzene at the cathode of an electrochemical cell. In this paper, Haber pointed out that, by controlled variation of the electrical potential of the cathode material, either azoxybenzene or hydrazobenzene could be obtained in predominant yields as the products of the reduction reaction occurring at the cathode. From this, Haber concluded that in such step-wise organic electrochemical reductions, the most important single factor in controlling the progression of the reaction and the degree of reduction was the cathode potential which was utilized.

This conclusion of Haber's has since been confirmed and is now a recognized principle among electrochemists. Haber's experimental observations of the role of controlled potential were, at the time of his investigations, somewhat limited since, at that time, the field of electronics had not evolved, and the instrumentation available to Haber for carrying out and controlling electrode potential was crude by modern standards, and had to be manually manipulated. For many years and until quite recently, the theoretical predictions and efforts at explanation of the importance and exact role of controlled electrode potential did not push beyond the frontier established by Haber's work. The chief reason for the lack of enthusiasm for methods relying upon controlled electrode potential was that the classical, manually operated electrical circuits were tedious and difficult to operate and required constant supervision during the process.

During the 1940's, the impediment to a closer and less theoretical examination of the role played by electrode potential which had been posed by the previous lack of suitable electrical control instrumentation was partially overcome by the improved control circuits developed by such workers as Hickling, Caldwell, Parker, Diehl and Lingane. These workers developed circuits for automatically controlling electrode potential within a predetermined range. For example, the Lingane potentiostat developed in 1945 was able to automatically control the electrode potential to within 0.015 volt while operating at relatively low currents suitable for laboratory analyses and investigative work.

Despite the advances in control circuitry effected by Lingane and others, electrolytic techniques relying upon controlled electrode potential continued to be relegated to laboratory applications or were used primarily in analytical procedures, the study of organic reaction mechanisms, or the preparation of small quantities of specialty chemicals. Large scale production of less sophisticated organic compounds on a commercial basis by the process of electrolytic oxidation or reduction continued to be a relatively infrequent practice due to the inability to maintain the required potential control at the extremely large currents required for such commercial production. Only within the last several years has the vast potential of this preparative technique been fully appreciated, and efforts directed toward the development of control systems which will maintain the electrode potential at the desired value while operating at currents sufficiently large to make commercial organic electrolysis feasible. Dr. M. J. Allen and his co-workers have recently developed an electronic control unit which is capable of automatically controlling the potential of the electrodes of an electrochemical cell to within ±10 millivolts and can deliver 24 amperes at 125 volts.

Despite the substantial improvement afforded by the Allen control instrument over that which had been available with pre-existing control circuitry, it will be apparent to electrochemists that the large quantities of current required to commercially produce reasonably large quantities of organic electrolytic oxidation or reduction products cannot be provided by the Allen instrument while maintaining the electrode potential control which is required in the case of many organic reactions in order to attain the degree of product selectivity necessary to produce compounds of suitable purity. Thus, for example, only about 1200 pounds of p-aminophenol can probably be prepared annually by the electrochemical reduction of nitrobenzene using the Allen control instrument at full power.

The present invention comprises an improved apparatus and process for electrochemically synthesizing a variety of compounds, and particularly, the reduction products of nitrobenzene, so that such compounds may be prepared in increased yields and with improved efficiency over that which has heretofore been attainable using the equipment available for carrying out such electrochemical organic reactions. By the improved instrumentation of the present invention, the electrode potential may be accurately controlled and maintained constant to within ±1 millivolt. This degree of control then permits, for example, an improvement of from about 6 percent by weight to about 10 percent by weight in the yield of phenylhydroxylamine produced by the reduction of nitrobenzene over the yield which can be realized using instrumentation of the type which is capable of controlling electrode potential to only ±10 millivolts. Moreover, the potential control of ±1 millivolt which is available using the electrolytic apparatus of the present invention can be maintained while the instrument delivers 500 amperes of current at substantially any desired voltage.

It may thus be perceived that with the power output available from the apparatus of the present invention, and the fine potential control which can be maintained over a wide range of power output and during passage of the higher currents which can be developed with the instrumentation, the commercial production of large quantities of the reduction products of nitrobenzene by electrochemical methods is now rendered practical. Moreover, studies have indicated that an improvement in the economy with which the electrochemical reduction of nitrobenzene may be effected can be expected when the reduction is carried out at a predetermined, controlled cathode potential since, when such potential control is employed during the synthesis, the current efficiency of the process is substantially improved with a greater portion of the total current passed through the electrolytic solution being employed to convert the nitrobenzene to a desired reduction product.

To more specifically describe the instrumentation used in practicing the method of the present invention, the system includes, as is conventional in electrochemical apparatus of this general type, a vessel which contains a suitable electrolyte in which is disposed the electrochemically reactive material to be oxidized or reduced. In order to adapt the apparatus to the widest field of application, it is preferable to partition the vessel which contains the electrolyte into an anode compartment and a cathode compartment by means of a permeable or porous diaphragm or membrane. The electrolyte may be made up of two types of liquid material termed the catholyte and the anolyte according to whether the electrolyte material is located in the anode compartment or the cathode compartment. The anolyte and catholyte may be chemically different materials, or they may be physically different, such as by varying the concentration of the materials, or the anolyte and catholyte materials in some instances may be identical. However, in the case of the nitrobenzene reduction reaction with which the present application is particularly, and in one of its more specific aspects, concerned, the anolyte and catholyte preferably differ slightly in their composition as will be hereinafter explained and discussed in greater detail.

Immersed in or placed in contact with the electrolyte in each of the anode and cathode compartments are a pair of electrodes termed, respectively, the anode and cathode, depending upon the polarity of the respective electrode in the electrical circuit in which it is connected. Finally, a standard electrode of fixed or constant potential is immersed in, or placed in contact with, the electrolyte, and is placed in close proximity to either the anode or cathode, depending upon whether the electrochemical reaction which is to be carried out entails a reduction (loss of electrons) or an oxidation (gain of electrons). The reduction reactions will, of course, occur at the cathode of the electrolytic cell and the oxidation reactions will occur at the anode. Accordingly, the standard electrode of constant potential will be placed in proximity to that one of the cell electrodes at which the particular reaction being carried out will occur. The purpose for this arrangement will be hereinafter explained.

The anode and cathode of the electrolytic cell used in the invention are connected to the output of a rectified alternating current supply controlled by a saturable core reactor. A novel control circuit which is responsive to the potential developed between the constant potential standard electrode and the anode or cathode with which it is associated is operably connected to the control winding of the saturable core reactor. When the potential between the standard electrode and the associated cell electrode varies from a predetermined set point which corresponds to the constant electrode potential at which the electrochemical reaction is to be carried out, the control circuit develops a signal which is used to control the current regulating means so that the current being supplied to the anode and cathode is likewise varied to correct the potential deviation between the standard electrode and the associated anode or cathode. The control circuit includes a novel combination parallel and series connected amplifier arrangement to obtain the desired gain without causing the relatively slow responsive reactor to "hunt" or oscillate. The entire system permits a finely and precisely controlled potential to be maintained at either the anode or cathode over the entire reaction period so that the benefits which may be ascribed to closely controlled electrode potential when used in electrochemical reactions may be derived from the use of such apparatus. As hereinbefore indicated, a potential control of ±1 millivolt at a power output as high as 600 kilowatts is obtainable using the circuitry of the present invention.

Other important and novel aspects of the process of the present invention relate to the particular reaction conditions which are employed in the reduction of nitrobenzene to produce optimum yields of p-aminophenol and other reduction products. Such reaction conditions, which have been optimized under the process of the present invention include selection of the electrolyte, temperature for carrying out the reaction, pH of the reaction medium, duration of the reaction, etc. These parameters and their significance will be discussed in greater detail hereinafter.

From the foregoing description of the invention, it will have become apparent that it is a major object of the present invention to provide an improved method and apparatus for carrying out organic electrochemical reactions.

A further object of the present invention is to provide a precisely controlled electrode potential in systems which may be used for the electrochemical oxidation and reduction of organic compounds.

Still another object of the invention is to provide a method and apparatus for increasing the product selectively in the electrochemical oxidation and reduction of organic compounds where a number of reduction products may be derived from a single starting material depending upon the potential applied to, and maintained at, either the anode or cathode of the cell (depending upon whether the reaction being carried out is an oxidation or a reduction reaction).

Yet another object of this invention is to provide a method and apparatus for improving the current efficiency at which certain electrochemical reactions entailing the oxidation and reduction of organic compounds may be carried out.

A more specific object of the present invention is to provide an improved method for electrolytically reducing nitrobenzene.

Another, yet more specific, but non-limiting object of the invention is to provide an improved process for electrolytically producing p-aminophenol.

In addition to the foregoing described objects and advantages of the invention, additional advantages and useful aspects of the method and apparatus of this invention will become apparent to the reader as the following detailed description and discussion of the invention is considered conjunctively with a perusal of the accompanying drawings which illustrate the invention.

In the drawings:

FIGURE 1A is a schematic illustration of a vessel used for the reduction of nitrobenzene, along with a wiring diagram of the power supply for the anode and cathode used in the reaction vessel.

FIGURE 1C is a schematic wiring diagram of the control amplifier portion of the control circuit.

FIGURE 1D is a schematic wiring diagram of the reset amplifier of the control circuit.

Figure 2:
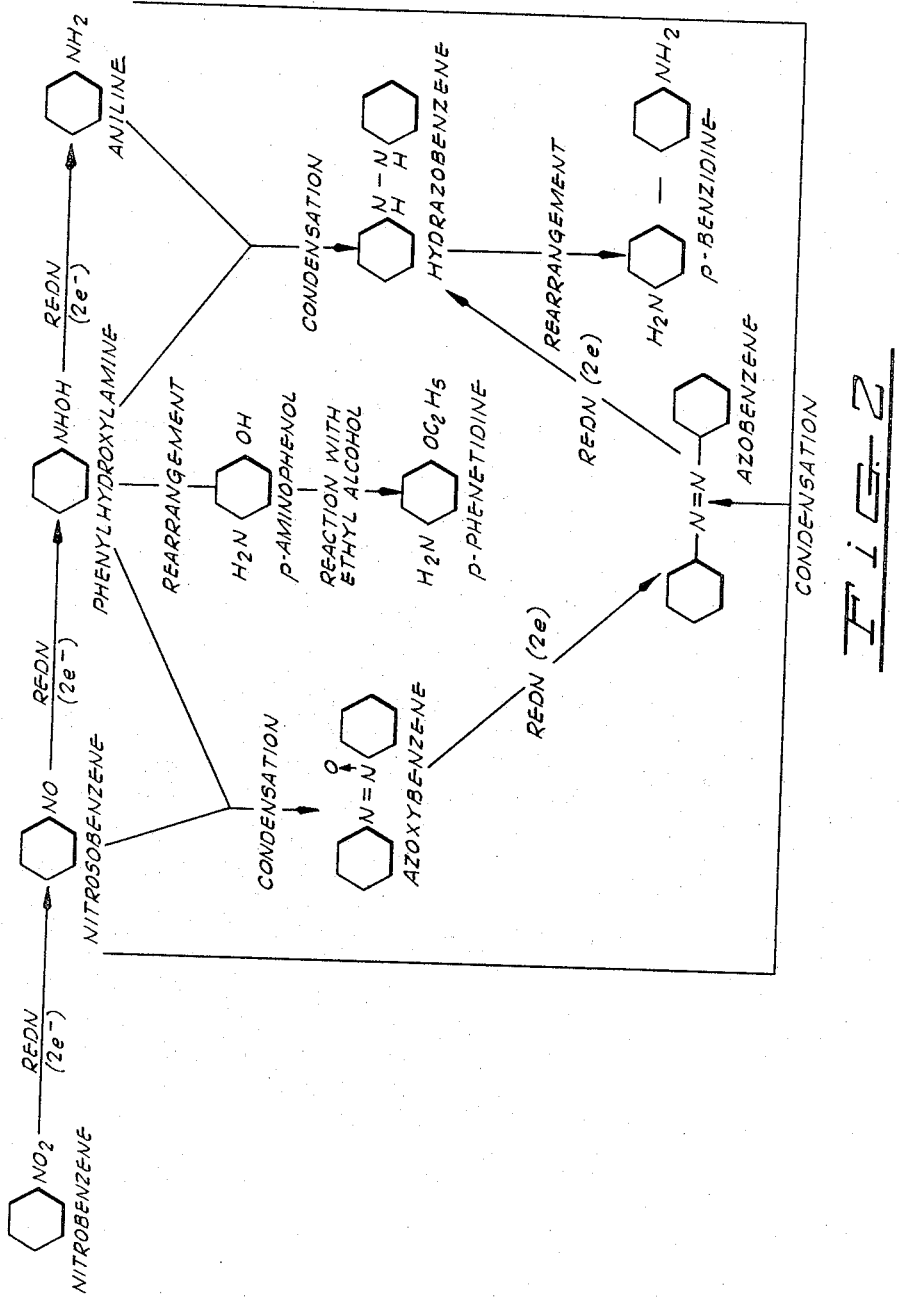

FIGURE 2 is a schematic reaction diagram showing the possible products which one may expect to be formed as a result of the reduction of nitrobenzene in an air-free solution using alcoholic sulfuric acid as the electrolyte. It will be perceived that the reaction diagram includes, in addition to the reactions occurring through electrolytic reduction, those reactions which occur as a result of the chemical combination or rearrangement of certain of the reduction products.

Figure 3:
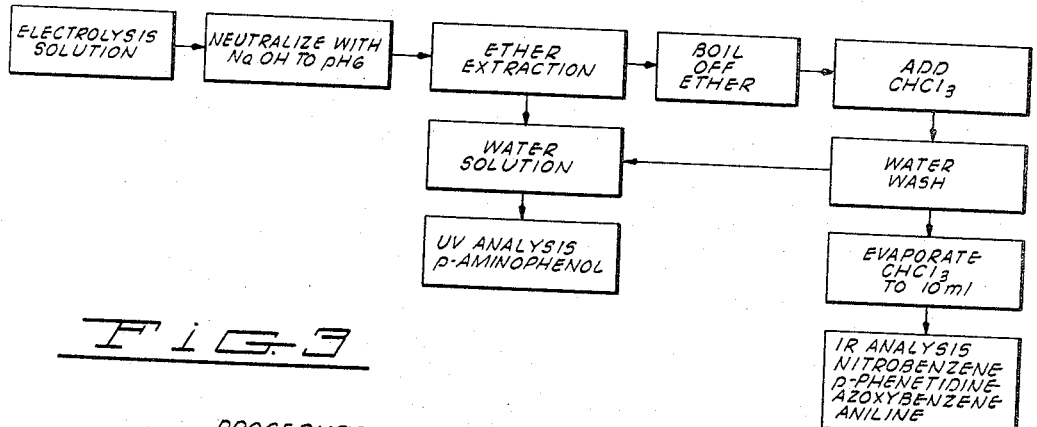

FIGURE 3 is a block diagram illustrating the analytical procedure used in analyzing the products produced by the electrolytic reduction of nitrobenzene in accordance with the present invention.

FIGURES 4 through 7 are graphs illustrating the effect of using differing controlled constant cathode potentials in electrolytically reducing nitrobenzene.

Figure 8:
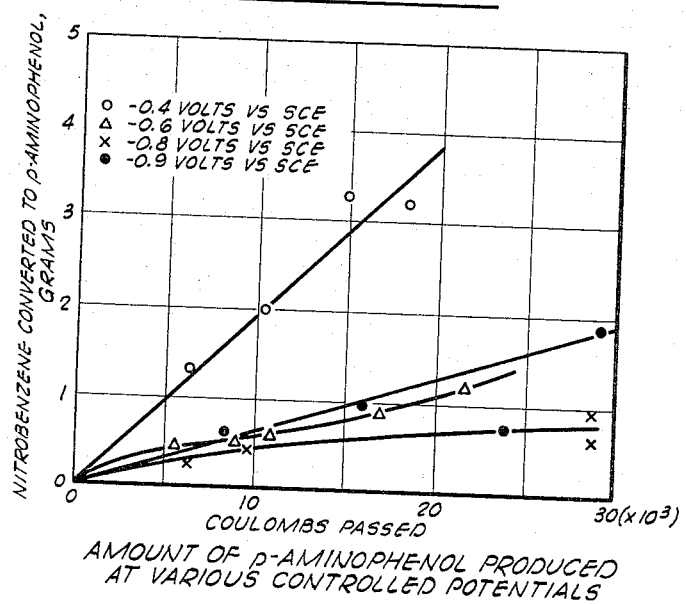

FIGURE 8 is a graph illustrating the variation in the amount of p-aminophenol produced by the electrochemical reduction of nitrobenzene when such reduction is carried out at varying controlled cathode potentials.

FIGURE 9 is a graph illustrating the dependency of the p-aminophenol yield on temperautre, both when the nitrobenzene reduction to p-aminophenol is carried out using controlled cathode potential as well as when the reduction is carried out without controlling the cathode potential.

Prior to referring specifically to the drawings forming a part of the present application, it should be noted that though the improved potential control apparatus of this invention is hereinafter described, by way of example, as it is employed in carrying out the reduction of nitrobenzene to its several reduction products, other organic oxidation and reduction reactions can also be carried out utilizing the electrolytic equipment herein described. In many situations where the primary requirements in a particular process are a high current capacity and a fine and exact degree of potential control, the structure hereinafter described may be applied with excellent results.

Referring now to FIG. 1A, the electrochemical cell of the invention may, in one embodiment, assume the form of a plural-necked flask 10 which contains a pool of mercury 11 forming the cathode in the bottom thereof. The largest neck 12 of the flask 10 is partitioned intermediate its length by a permeable membrane or diaphragm 13 to provide an anode compartment 14 in which is located an anode 16, and a cathode compartment 17 containing the pool of mercury 11. In one embodiment of the invention, the anode may be in the form of a platinum gauze cylinder as shown in FIG. 1A.

The other necks of the flask 10 are used to accommodate a stirrer 20, the salt bridge 21 of a constant potential standard electrode, such as a calomel reference half-cell 22, and a conduit 24 for introducing catholyte to the cathode compartment or withdrawing catholyte and reaction product from the cathode chamber. It will be noted that the end of the conduit 24 is immersed in the catholyte so that, if desired, catholyte or reaction product can be withdrawn from the cell by applying a vacuum to the conduit. The platinum anode, mercury cathode and reference half-cell are, of course, connected to suitable electrical leads 26, 28 and 30, respectively. The leads 28 and 30 are illustrated as having terminals 28a and 30a to facilitate the illustration and description of the control circuit as will hereinafter appear. It is to be noted that the terminal of the salt bridge 21 used in the standard electrode is positioned closely adjacent the surface of the mercury cathode 11. This effectively minimizes the amount of ohmic potential drop which is necessarily included in the apparent cathode potential measured between the mercury cathode and the saturated calomel reference electrode.

Various types of electrolytes may be employed in the electrochemical cell and will depend in each case on the type of reaction to be carried out, and to some extent, upon the electrode potential which is to be employed. Studies on the nitrobenzene system have indicated that, in the case of the reaction of nitrobenzeene, an alcohol-water mixture provides the most satisfactory medium, considering the need for a high degree of mutual solubility of the nitrobenzene reactant and the electrolyte to be employed. Since reviews by Swan and Allen have concluded that the electrochemical reduction of nitrobenzene is less complicated by side reactions when an acid electrolyte is employed than when a neutral or basic medium is used, the final electrolyte chosen for use in the process of the present invention when applied to the electrolytic reduction of nitrobenzene was a 2 N sulfuric acid solution is a 40/60 ethanol-water mixture (water referring to the acid solution). The anolyte employed has consisted merely of a 20 percent sulfuric acid solution in water. The permeable membrane 13 which is used to partition the cathode compartment from the anode compartment may be any material which offers little resistance to the passage of current therethrough, will not clog in use, is not reactive with the anolyte or catholyte, and can withstand elevated temperatures. A fritted glass or metal disc may be used as the membrane, or it may be constructed of a synthetic fiber impregnated with cross linked ion exchange resins. Other suitable membranes will occur to those skilled in the art.

Although the system described has been found in our investigations to be excellent for the reduction of nitrobenzene to certain of its reduction products, the type of supporting electrolyte which is chosen may vary widely, and proper choice of the catholyte or anolyte in which the electrolytic reaction is to take place is important relative to the degree of control of the working electrode potential which is required. The pH of the electrolyte solution is also an important factor in determining what control potential should be employed in the case of a particular reaction. For example, as will be hereinafter pointed out, in the reduction of nitrobenzene, the yield of p-aminophenol may be made to predominate by using an acidic electrolyte having a pH of about 5.4. However, by increasing the pH to a neutral or alkaline value, the production of azoxybenzene, azobenzene and hydrazobenzene may be made to predominate.

The type of electrodes chosen for a particular electrochemical reaction is of great importance relative to the efficiency with which the reaction will be carried out, and the ease with which a particular reduction or oxidation may be effected. In our studies of the nitrobenzene reaction, a number of electrodes were tested and those having relatively low hydrogen over voltage were discarded in that polarographic studies indicated these electrodes to be unsuitable for the nitrobenzene reduction. Mercury, on the other hand, exhibits high hydrogen over voltage behavior and the polarographic nitrobenzene reduction wave is quite distinct in a current-voltage characteristic curve for this electrode.

In general, any half-cell of constant potential value can be used as the reference electrode 22. Conventionally, the reference electrode 22 may, for example, be a saturated calomel half-cell or a silver-silver chloride half-cell. It is within the scope of this invention to employ reference electrodes which are either disposed in the electrolyte in direct contact therewith, or which are electrically communicated with the electrolyte through a suitable electrolytic bridge.

While ordinarily the cathode and anode of the electrolytic cell are selected on the basis of non-reactivity in the course of electrochemical reaction being conducted in the cell, the apparatus and electrical circuitry which are provided by the present invention may also be employed in carrying out processes wherein a consumable electrode is employed. Examples of electrodes of this type are a lead cathode used in the preparation of tetraethyl lead, and an aluminum cathode used in the preparation of aluminum trialkyls.

In accordance with the present invention, and as illustrated in FIG. 1A, the power supplied to the cathode 11 and anode 16 takes the form of an AC power supply or generator 32 driving a rectifier 34 through a power transformer 36. The negative terminal of the rectifier 34 is connected to the cathode 11 through the conductor 28 and the positive terminal of the rectifier 34 is connected to the anode 16 through the conductor 26 to provide a flow of electrons from the cathode 11 to the anode 16 for the reduction of the nitrobenzene contained in the cathode compartment 17.

The output of the AC power supply 32, and hence the passage of current between the cathode 11 and anode 16, is controlled by a saturable core reactor 38 interposed in series between the power supply 32 and the power transformer 36. The control winding 40 of the saturable core reactor 38 is illustrated in FIG. 1A as having terminals 40a and 40b for connection with a novel control circuit, as will be described below. As is well known in the art, a DC current flowing through the control winding 40 tends to saturate the core of the reactor 38 and increase the AC current flowing through the AC windings 32a and 32b, and when no current flows through the control winding, no AC current flows through the AC windings 32a and 32b.

A saturable core reactor has been found to be a rugged and reliable device for use in controlling electrochemical reactions to such a degree that substantially any desired power may be supplied to the cathode and anode of the system. However, a saturable core reactor has the inherent characteristic of having a relatively slow response; hence the novel control circuit of this invention.

Figure 1B:
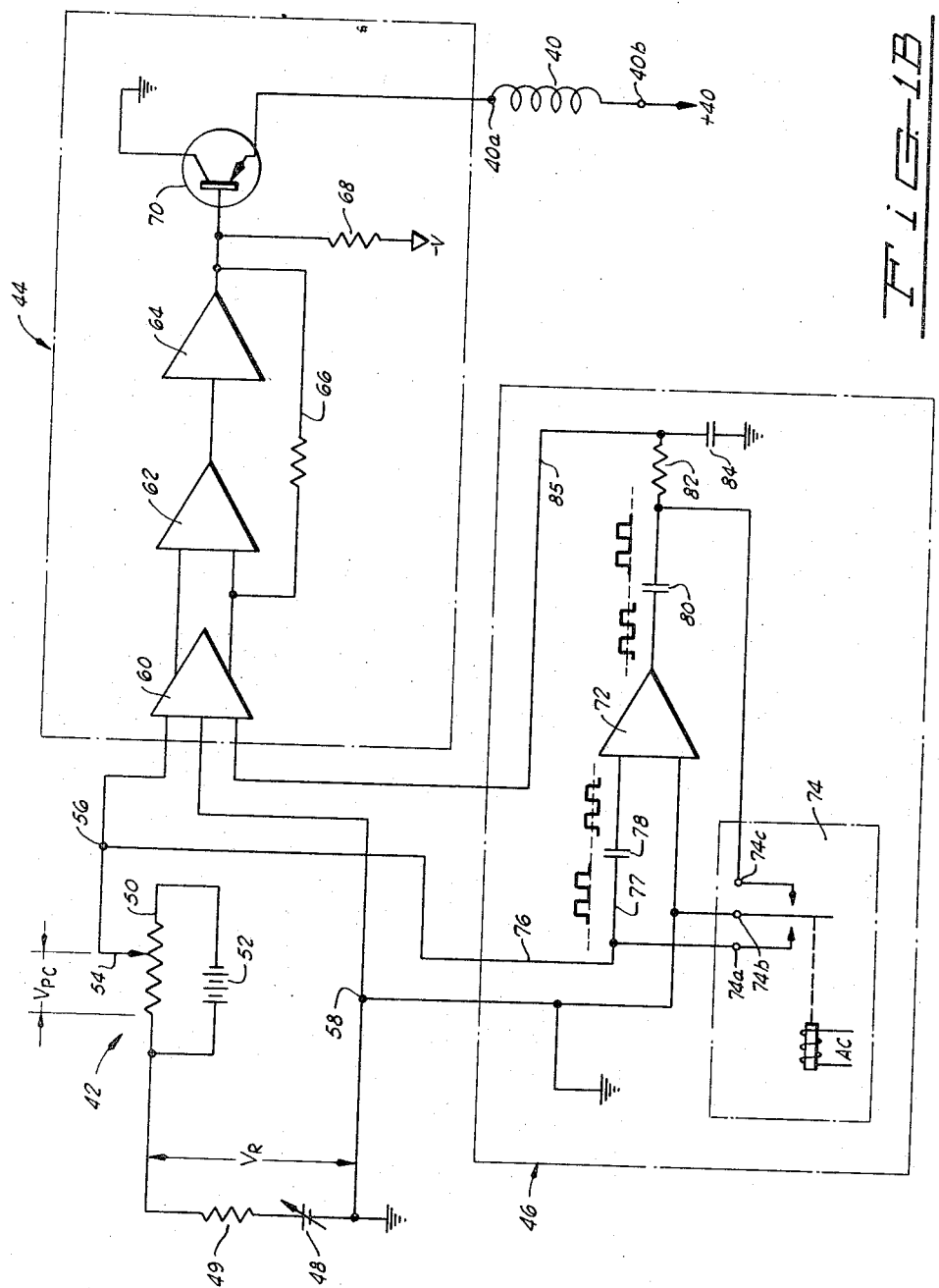
FIGURE 1B is a block diagram of the novel control circuit of this invention.

Before proceeding with a detailed description of the control circuit, reference should first be made to the block diagram illustrated in FIG. 1B. As shown in FIG. 1B, the control circuit basically comprises a controller, generally designated by reference character 42 and hereafter referred to as the set-point controller; a control amplifier 44 and a reset amplifier 46. For convenience of illustration in FIG. 1B, the reference potential normally provided between the cathode or anode of an electrochemical system and a standard reference electrode is illustrated by an ideal battery 48 provided with an arrow to indicate that the potential varies. A resistor 49 is connected in series with the potential source 48 to represent the normal resistance between the electrodes giving rise to the reference potential. The total voltage across the source 48 and resistor 49 will be known as the reference potential and is indicated by $V_R$ on the drawing. $V_R$ in an electrochemical system for the reduction of nitrobenzene may be, for example, 0.4 volt.

The set-point controller 42 comprises a potentiometer 50 and a battery 52 connected in series and an adjustable contact 54 engaging the potentiometer 50. The desired potential to be maintained by the controller 42 is determined by the position of the contact 54. This control potential may be referred to as $V_{PC}$ and is the potential developed between the end of the potentiometer connected to the positive terminal of the battery 52 and the contact 54, as indicated in the drawing. It may also be noted that the battery 52 will be a stable battery, such as a mercury cell batery, to provide the minimum in fluctuations of $V_{PC}$ when the contact 54 remains in a fixed position for a particular electrochemical reaction.

The positive terminal of the reference voltage source 48 is connected through the resistor 49 to the positive side of the set-point control battery 52, and the negative side of the source 48 is connected to ground. It will thus be apparent that $V_R$ is bucking $V_{PC}$ to provide an error voltage across terminals 56 and 58 equal to $V_R - V_{PC}$. This error voltage or signal may be referred to as $V_E$, and it will be understood that $V_E$ may be positive or negative. In any electrochemical system, $V_R$ will vary as the reaction proceeds, but the degree of variation will depend upon the control maintained on the current flowing between the cathode and anode of the system. In the present case, the degree of variation of $V_R$ is indicated by $V_E$. In an ideal case, $V_E$ is zero and $V_R$ equals $V_{PC}$. In one embodiment of this invention, $V_{PC}$ has been set to be 0.4 volt. The present control circuit will maintain $V_R$ within ±1.0 millivolt of $V_{PC}$.

As shown in FIG. 1B, the error voltage appearing across the terminals 56 and 58 is impressed on one grid of a differential amplifier 60 of the control amplifier 44 to provide a first stage of voltage amplification. The amplified output of the differential amplifier 60 is impressed on a second differential amplifier 62 to provide a second stage of voltage amplification. Both of the differential amplifiers 60 and 62 are, of course, DC amplifiers and provide voltage amplification. The output of differential amplifier 62 controls the operation of a cathode follower 64 which provides power amplification of the error signal. It will also be noted that a feedback loop 66 extends from the output of the cathode follower 64 to the input of the differential amplifier 62 to reduce the net gain of the control amplifier 44 and maintain stability of operation.

The output of the cathode follower 64 appearing across a cathode resistor 68 may be designated as the "control signal" which is impressed on the base of a PNP transistor 70. The collector of the transistor 70 is connected to ground and the emitter of the transistor is connected to the terminal 40a of the saturable core reactor control winding 40. With this arrangement, the opposite terminal 40b of the winding 40 is connected to a source of DC power, such as a positive 40 volt supply. Since the transistor 70 will conduct when the base thereof is more negative than the emitter, the amount of current flowing through the control winding 40 will increase as the control signal goes in a negative direction, and vice versa. For example, assume that the potential at terminal 40a is +5.2 volts, the base of the transistor may be, for example, biased to +5 volts in the absence of an error signal. A negative error signal would decrease the positive potential on the base of the transistor 70 below 5 volts, to increase the amount of current flowing through the control winding 40, which would thus increase the power supplied to the electrochemical system.

The control amplifier 44 has a fast response compared with the response of the saturable core reactor 38, thus the gain of the control amplifier 44 must be limited to prevent "hunting" or oscillation of the saturable core reactor. In other words, the effect of rapid variations in the error signal would be immediately applied by the control amplifier 44 on the control winding 40 of the saturable core reactor 38; however, the saturable core reactor 38 will not respond simultaneously with such rapid variations in the error signal and would constantly change to catch up with the changing error signal, which changes would in turn provide new error signals. As a result, the reset amplifier 46 is provided to obtain the desired gain only upon sustained variations in the error signal, as well as to overcome the effects of drift in the DC amplifiers included in the control amplifier 44.

The reset amplifier 46 basically comprises an AC amplifier 72 and a chopper 74. The error signal appearing across the terminals 56 and 58 is impressed on the chopper 74 by connecting the terminal 56 to a stationary contact 74a in the chopper by a conductor 76, with the terminal 58 being connected to the movable contact 74b of the chopper. Thus a pulsating DC is provided in a conductor 77 connecting the conductor 76 to the amplifier 72. A condenser 78 is interposed in the conductor 77 to convert the pulsating DC to a substantially square wave AC which is in turn amplified by the amplifier 72 at a gain of, for example, 130. The square wave output of the amplifier 72 is coupled to another stationary contact 74c in the chopper 74 through a condenser 80 to convert the square wave to a pulsating DC signal which is 180° out of phase with the signal fed to the amplifier 72. The resulting pulsating DC signal is subjected to a low pass filter comprising a resistor 82 and condenser 84 to provide an amplified error signal in a conductor 85 having a polarity opposite to the polarity of the original error signal appearing across the terminals 56 and 58.

The modified error signal in conductor 85 is applied to another grid of the differential amplifier 60 of the control amplifier 44. It will thus be seen that the output of the differential amplifier 60 comprises an amplification of the difference between the original error signal appearing across the terminals 56 and 58 and the modified error signal produced by the reset amplifier 46. It should also be noted that the low pass filter (resistor 82 and capacitor 84) used for producing the modified error signal has a relatively long time constant, such as a 0.02 cycle per second, to minimize the rate of variation of the modified error signal compared with the variations in the original error signal. In other words, the original error signal must persist at a given amplitude for an appreciable period of time before there is a change in the modified error signal produced by the reset amplifier 46. And, since the modified error signal is subjected to substantially more amplification than the original error signal, the modified error signal will have the major control on the amplitude of the control signal applied to the base of the transistor 70 during sustained variations in the error signal. Variations in the original error signal of short time duration will have a minor effect on the amount of current flowing through the control winding 40 of saturable core reactor 38 and will not cause the reactor to "hunt."

A more detailed disclosure of the control amplifier 44 is contained in FIG. 1C. It will there be noted that the positive side of the set-point control reference battery 52 is connected to the reference electrode terminal 30a, and the cathode terminal 28a is connected to ground, such that the potential of the reference electrode with respect to the cathode of the electrochemical system shown in FIG. 1A is in bucking or opposing relation to the potential of the battery 52. The degree of bucking is determined by the setting of the moving contact 54 of the set-point controller 42. It will further be noted that the terminal 28a, which is connected to the cathode 11 of the system shown in FIG. 1A, forms a common potential for the control circuit. The setpoint controller 42 of FIG. 1C is the same as the controller 42 illustrated in the block diagram of FIG. 1B and will therefore not be repeated at this point. It will thus be apparent that the error signal is picked off by the contact 54 and is transmitted through the conductor 76 to the reset amplifier, as will be described, as well as to the first amplifier 60 in the control amplifier 44.

The amplifier 60, as previously indicated, is a differential amplifier and may comprise, for example, a double triode type 12AY7 tube having its cathodes coupled through a balancing resistor 90. The movable contact 92 of the balancing resistor 90 is connected through a resistor 94 to a negative voltage source, such as —300 volts DC, in order that the response of the two triodes of the amplifier 60 may be controlled as desired. The plates of the triodes 60a and 60b are biased by a positive voltage source of, for example, 300 volts through resistors 95. The error signal occurring at the contact 54 of the set-point controller 42 is imposed on the grid of one triode 60a of the amplifier 60 through a limiting resistor 96 to control the operation of the triode 60a of the amplifier. It will also be noted that AC components are filtered from the error signal between the resistor 96 and the respective grid connection by a condenser 98 coupled to a common conductor 100 connected to terminal 28a and ground. It will thus be apparent that the original error signal is amplified by the triode 60a of the tube 60 with an amplified replica thereof appearing at the plate of the respective side of the tube.

The modified error signal produced by the reset amplifier 46, as previously described, is conducted through the conductor 85 and is imposed on the grid of the right hand triode 60b of the tube 60 through a limiting resistor 102. It will also be noted that AC components of the modified error signal are eliminated by a condenser 104 connected to the common conductor 100 and to the conductor 85 between the resistor 102 and the respective grid connection. Thus, the modified error signal is amplified by the triode 60b of the tube 60, with an amplified replica thereof appearing in the respective plate circuit.

As previously indicated, the outputs of the first differential amplifier 60 are imposed on the second differential amplifier 62 to provide a further voltage amplification. The amplifier 62 may be, for example, a double triode type 12AX7 tube having its cathodes coupled to the negative voltage source, such as —300 volts DC, through a resistor 105. The amplified version of the original error signal appearing at the plate of the triode 60a of the tube 60 is conducted through conductor 106 and a limiting resistor 108 to the grid of one triode 62a of the tube 62. This signal is leveled or opposed by a negative voltage source, such as —300 volts DC imposed upon a conductor 110, as limited by a resistor 112, in order that the desired operating level of the tube 62 may be maintained. The amplified original error signal is thus used to control the portion 62a of the tube 62. However, the plate of the tube portion 62a is connected to the common conductor 100, such that the output of the amplifier 62 will be only from the plate circuit of the other triode 62b and will be what is normally called a single-ended signal. It will be noted, however, that the triode 62a functions as a cathode follower, such that the original error signal does affect the output of triode 62b.

The amplified replica of the modified error signal appearing at the plate of the first differential amplifier triode 60b is impressed on the grid of the triode 62b of the tube 62 through a conductor 114 and limiting resistor 116. This signal is opposed by the negative voltage appearing in conductor 110 through a resistor 118 to control the operating level of the triode 62b of the differential amplifier tube 62. Thus, the triode 62b of the tube 62 amplifies the modified error signal through another stage of voltage amplification.

The third stage amplifier 64 is, as previously indicated, a cathode follower, such as one-half of a type 12AT7 tube, to provide a power amplification of the modified error signal and produce the control signal previously mentioned. It may also be mentioned that the feedback loop 66 is connected to the cathode of the tube 64 between leveling resistors 120 and 121 to provide a feedback to the grid of the triode 62b of the second stage amplifier 62 through a resistor 122 to reduce the gain of the control amplifier and maintain stability as previously mentioned. The amplified and modified error signal appearing at the plate of the portion 62b of the tube 62 is transmitted through a limiting resistor 124 to the grid of the cathode follower 64 to control the operation of the follower. The maximum positive voltage applied to the grid of the follower 64 (and hence to the base of the transistor 70) is maintained by a positive voltage source, such as a positive 40 volts DC, through a suitable diode 126.

As previously indicated, the cathode of the cathode follower 64 is connected to the base of the transistor 70 and is connected to the negative voltage source through the resistor 68 to maintain a flow of current through the follower when the cathode is anywhere between zero and +40 volts DC. In addition, a diode 128 is connected between the base of the transistor 70 and the common conductor 100 to prevent a negative potential being applied to the base of the transistor and prevent a breakdown of the transistor.

The reset amplifier 46 is shown more in detail in FIG. 1D. It will there be observed that the AC amplifier 72 comprises a double triode amplifier, such as a 12AX7 tube containing two triode portions 72a and 72b. The plates of both portions 72a and 72b are connected to a positive voltage source, such as +300 volts through suitable plate resistors 130. Further, the cathode of each portion 72a and 72b is connected to the common conductor 100 through a resistor 132 and condenser 134 connected in parallel therewith.

As previously described, a portion of the original error signal is imposed on the conductor 76 and is in turn imposed on a fixed contact of the chopper 74 to convert the DC error signal to a pulsating DC signal. It may be noted, however, that resistances 136 and 138 are interposed in the conductor 76 to limit the error signal imposed on the amplifier 72. Also, the conductor 76 is connected to the common conductor 100 through a condenser 140 to eliminate AC components in the original error signal. The pulsating DC produced by the chopper 74 in conductor 77 is converted by the condenser 78 to a substantially square wave AC which is in turn imposed on the grid of the triode 72a of the amplifier 72.

The triode 72a of the amplifier 72 provides an amplification of the signal imposed on the grid thereof and transmits such amplified signal through a conductor 142 which is coupled to the grid of the triode 72b of the amplifier 72 through a condenser 144. Also, a condenser 146 connects the conductor 142 to the common conductor 100 to provide a filtering action and maintain the desired wave shape of the signal transmitted to the grid of the triode 72b. The grids of both of the triodes 72a and 72b are maintained at the desired operating levels by resistors 148 and 150 connected between the respective grids and the common conductor 100.

The triode 72b of the amplifier 72 provides a further amplification of the AC version of the error signal to provide a highly amplified signal at the plate of this tube portion which is conducted through a conductor 152. This amplified signal is further shaped by a condenser 154 connected to the conductor 152 and the common conductor 100, and then is converted back to a pulsating DC signal by the condenser 80 previously mentioned in connection with the block diagram in FIG. 1B. The resulting pulsating DC signal is converted back to a DC signal by means of the chopper 74 through a conductor 156 connecting the stationary contact 74c of the chopper to the conductor 152. The resulting signal is limited to a predetermined maximum voltage by a pair of Zener diodes 158 connected in opposing senses between the conductor 152 and the common conductor 100. The limited signal is then smoothed by the low pass filter comprising the resistor 82 and the condenser 84. The low pass filter may actually include a second condenser 160, if desired. The smoothed and modified error signal is then transmitted through conductor 85 to the grid of the triode 60b of the first stage differential DC amplifier in the control amplifier 44 shown in FIG. 1C as previously described.

In summary, it will be seen that the control circuit provides a control for the saturable core reactor 38 which is sensitive to small variations in the potential between the reference electrode 22 and cathode 11 and yet will provide the necessary gain at the necessary response to effectively control the reactor. The arrangement of the control amplifire 44 and reset amplifier 46 provides a multiplication of the gains of these amplifiers. In other words, $V_E$ is multiplied by the gain of amplifier 44 and the gain of amplifier 46 in producing the control signal.

Referring next to FIG. 2 of the drawings, there are illustrated schematically the reactive mechanisms by which the electrochemical reduction of nitrobenzene may proceed. It will be observed that several steps of reduction may occur, and that in an acidic ethyl alcohol electrolyte solution, several rearrangements and/or condensations of the reduction products may be expected to occur to form several products in addition to those produced solely by reduction. Thus, a total of six reduction products may be formed, as well as several condensation and rearrangement products, plus two compounds, p-phenetidine and p-benzidene sulfate, which are formed by reactions of reduction products with the electrolyte.

In the cathodic reduction of nitrobenzene, the reaction sequence is, first, the reduction of nitrobenzene to nitrosobenzene with the concurrent loss of two electrons. The nitrosobenzene is then further reduced to phenylhydroxylamine with a further loss of an additional pair of electrons. Finally, the phenylhydroxylamine is reduced to aniline with a loss of two additional electrons. In addition to this sequence of reduction from nitrobenzene to aniline, coupling reactions can be achieved electrolytically, and by electrolytic reduction at the cathode. Thus, two molecules of nitrosobenzene may be coupled to each other with each of the molecules undergoing reduction during the coupling so that there is formed a single molecule of azoxybenzene. The azoxybenzene may also be formed by the condensation of a molecule of nitrosobenzene with one molecule of phenylhydroxylamine. This condensation is favored by an alkaline electrolyte medium, and if it is desired to form predominantly the azoxybenzene, rather than p-aminophenol or aniline, an alkaline, rather than an acidic, medium is employed. In either instance, precise control of the cathode potential is important and aids in the selectivity of the reaction.

Where azoxybenzene is formed by one of the described methods, a further reduction of this compound may be effected electrolytically to produce azobenzene and hydrazobenzene. Generally, a complete reduction of the azoxybenzene to hydrazobenzene will be effected without formation of substantial recoverable quantities of the azobenzene intermediate.

We have further determined by research and experimentation that the fate of the phenylhydroxylamine in the reaction mixture (that is, whether it is further reduced to aniline or permitted to undergo rearrangement to form p-aminophenol, etc.) may be controlled by careful control of the reaction conditions and of the cathode potential. Also, the yield of the p-aminophenol may be controlled to some extent by the duration of the passage of current through the reaction mixture, since prolonged or extended passage of current and high current densities results in the electrolysis of the ethyl alcohol, and the resultant reaction of the ions formed by such electrolysis with the p-aminophenol to form p-phenetidine as illustrated in FIG. 2.

As has been previously indicated, conducting electrochemical organic oxidation-reduction reactions at controlled electrode potential very frequently permits side reactions to be eliminated, and sequential or plural-step reduction reactions to be controlled as desired. Moreover, the current efficiency of such electrolytic processes is greatly increased when operating at constant electrode potential. By preventing the cathode potential from increasing to the point of producing hydrogen from the electrolyte, operation with controlled cathode potential can also greatly improve current efficiency when carrying out cathode reduction reaction in an aqueous electrolyte.

In the case of the reduction of nitrobenzene to its several reduction products, we have found that the yield of p-aminophenol may be made to predominate over the other products shown in FIG. 2 by carrying out the reaction in an acidic catholyte of the type hereinbefore described (2 N $H_2SO_4$ in 40 percent ethanol), and maintaining the cathode potential between −0.35 and −0.4 volt with the potential employed preferably being from −0.38 to −0.4 volt. Optimum yields of p-aminophenol are attainable operating at −0.385 volt ±1 millivolt. This degree of control is made possible with the electronic instrumentation of the present invention, and is particularly important when operating at the more economical ambient temperature, since at this temperature the yield of reduction product is more dependent upon cathode potential.

PROCEDURE USED IN ISOLATING AND ANALYZING THE PRODUCTS OF THE ELECTROLYTIC REDUCTION OF NITROBENZENE

Before proceeding to a consideration of specific examples of the reduction of nitrobenzene, and the data obtained in performing such reduction, it is believed well to set forth the procedure which was employed to isolate and analyze the products resulting from the electrochemical reduction of nitrobenzene.

The construction of the electrolytic cell has previously been described and it will suffice at this point merely to reiterate that in all of the nitrobenzene reduction experiments hereinafter described, the catholyte consisted of a 2 N sulfuric acid solution in ethanol in a 60:40 weight ratio (except in the hereinafter noted instance where a nonalcoholic electrolyte was used), and the anolyte generally consisted of a 20 percent sulfuric acid solution in water. The mercury cathode employed had a surface area of about 30 cm.² in area. At all times during the reduction, the solution was stirred by a mechanical agitator turning at 300 r.p.m., and the cell was maintained at a slight pressure under nitrogen to prevent contamination by air.

The electrolysis procedure is commenced by adding the mercury, the catholyte and the anolyte to the cell, and setting the cathode potential at a slightly more negative value than the particular constant cathode reduction potenial which is to be employed in the course of the reduction. This is a precautionary measure to insure that no reducible substances other than nitrobenzene will be present in the catholyte at the commencement of the nitrobenzene reduction. During the period of pre-electrolysis (maintaining the cathode potential at a more negative value than that to be used during the actual reduction), nitrogen is bubbled through the catholyte and the pre-electrolysis and nitrogen purging is continued for a period of at least two hours. The potential is then removed from the cell, and the nitrobenzene is added in the form of a predetermined quantity of redistilled nitrobenzene in a suitable volume of pre-electrolyzed, acidified water-ethanol solution. In all of the examples hereinafter described, 6 grams of the redistilled benzene were dissolved in 750 ml. of pre-electrolyzed water-ethanol solution containing 2 N sulfuric acid.

In the hereinafter described examples, the potential was controlled at various constant values during the different runs. During each run, recordings were made of the current passed and from this value the total coulombs were calculated. During the electrolysis runs and following the completion of the runs, the various reaction products were removed from the cathode chamber 17 and were subjected to analysis by infrared spectrophotometry. A few of the product compounds, notably, hydrazobenzene, could not be determined by infrared analysis due to their low absorption of infrared radiation, but these usually did not occur in measurable or significant quantities.

In determining the composition of the electrolysis mixture removed from the cathode compartment during and following an electrolytic reduction of nitrobenzene, the solution is first neutralized to pH 6 with concentrated sodium hydroxide solution. This is done because, as will be hereinafter described, some of the products are subsequently extracted from the electrolyte with ether and acidic solutions can be extracted only slowly with ether, and also because the alkalinity of the electrolysis mixture must be kept low in order to avoid the formation of certain condensation products. Upon near neutralization to pH 6 with sodium hydroxide, the solution may become saturated with sodium sulfate and this material is sometimes observed to crystallize, particularly during the subsequent extraction.

After addition of the sodium hydroxide, the near neutral solution is then extracted continuously with ether for 15 hours. Following the ether extraction, the ether solution contains water, alcohol, some acid and the reaction products. The ether is removed by heating the solution until the boiling point rises sharply, and the residue is then taken up in about 100 ml. of chloroform. At this point, crystals of p-aminophenol form and they are removed from the chloroform solution by washing with small aliquots of water. These washings are combined with the extracted electrolysis solution for the determination of p-aminophenol by ultra violet spectrophotometry. The chloroform solution is evaporated to a volume of 10 ml. and the other constituents are determined by infrared spectra. It is sometimes necessary to run several spectra on various dilutions of the chloroform solution when a component is present at a relatively high concentration. FIG. 3 shows in schematic form the entire analytical procedure hereinbefore described.

In order to evalute the effect of maintaining a constant cathode potential in the course of the electrolytic reduction of nitrobenzene, a number of runs were carried out using the procedure hereinbefore described, during which runs such parameters as cathode potential, temperature and total amount of current passed were observed and evaluated. The following examples, when considered in conjunction with the drawings, present the data which were obtained from the several runs and clearly demonstrate the effect of controlling the cathode potential in a predetermined manner during the nitrobenzene reduction reaction.

*Example 1*

6 grams of nitrobenzene in a catholyte consisting of a 2 N sulfuric acid solution in 750 ml. of a 40 percent by weight to 60 percent by weight ethanol-water mixture were subjected to electrolytic reduction using a controlled cathode potential of —0.4 volt. During the runs, agitation of the contents of the cathode compartment was provided by a paddle stirrer turning at 300 r.p.m. The cathode potential was measured with respect to a standard calomel half-cell.

Under the reaction conditions employed in this and the other examples hereinafter set forth, nitrosobenzene was never observed in the electrolysis product, and the small amount of p-benzidine which sometimes formed precipitated from solution as benzidine sulfate. The phenylhydroxylamine formed by reduction in the manner illustrated in FIG. 2 was substantially depleted by the several indicated reactions. Although azobenzene and hydrazobenzene were formed in small amounts, these were not included in the analysis schemes. Thus, four or five reduction products usually accounted for over 90 percent of the electrical current passed through the nitrobenzene solution in effecting the reduction. Table I shows the principal products found and analyzed, their molecular weights and the number of coulombs required for the formation of 1 gram of each of the products as a result of the electrolytic reduction of nitrobenzene.

TABLE I.—PRINCIPAL PRODUCTS OF ELECTROLYTIC REDUCTION OF NITROBENZENE

| Compound | Molecular Weight | Coulombs/gram |
|---|---|---|
| Nitrobenzene | 123.11 | |
| p-Aminophenol | 109.12 | 3,540 |
| p-Phenetidine | 137.18 | 2,810 |
| Azoxybenzene | 198.22 | 2,920 |
| Aniline | 93.12 | 6,220 |

Table IIA shows the percentage of the 6 grams of nitrobenzene which is converted to various reduction products as a function of the total number of coulombs passed through the solution when the cathode potential is retained constant at —0.4 volt. The maximum yield of p-aminophenol was 62 percent and occurred when 14,900 coulombs had been passed through the solution. After this time, the rate of conversion of the p-aminophenol to p-phenetidine appeared to exceed the rate of formation of p-aminophenol so that a lesser yield of the latter compound was realized. Carrying out the reduction in an aqueous electrolyte with the elimination of alcohol from the solution prevented the formation of p-phenetidine, but the maximum yield of p-aminophenol was no greater than for the comparable reduction in an alcoholic solution as is reflected by the data set forth in Table IIB. It is interesting to note, however, that in the case of both the alcoholic and nonalcoholic electrolyte, apparently the greatest reduction to the p-aminophenol or its product of reaction with the alcoholic electrolyte (p-phenetidine) occurs after 14,900 coulombs of current have been passed. Moreover, it is important to note that the current transported by the nitrobenzene in the nonalcoholic solution was much lower due to the limited solubility of the nitrobenzene in the nonalcoholic solvent. Thus, a correspondingly longer time was required to reach a given value of coulombs passed which probably increased the formation of azobenzene and hydrazobenzene.

TABLE IIA.—PRODUCTS FORMED IN CONTROLLED POTENTIAL REDUCTION OF NITROBENZENE AT −0.4 VOLT VS. S.C.E

| Total Coulombs Passed | Unreacted Nitrobenzene | | Azoxybenzene | | | p-Phenetidine | | | p-Aminophenol | | | Total Recovery | |
|---|---|---|---|---|---|---|---|---|---|---|---|---|---|
| | Grams | Percent NO$_2$ | Grams | Percent NO$_2$ | Percent Coul. | Gram | Percent NO$_2$ | Percent Coul. | Grams | Percent NO$_2$ | Percent Coul. | Percent NO$_2$ | Percent Coul. |
| 6,200 | 3.70 | 62 | 0.64 | 13 | 30 | Absent | | | 1.2 | 23 | 69 | 97 | 99 |
| 10,400 | 2.40 | 40 | 1.10 | 22 | 30 | 0.10 | 2 | 3 | 1.8 | 34 | 61 | 98 | 94 |
| 14,900 | 0.72 | 12 | 0.90 | 19 | 18 | 0.46 | 7 | 9 | 3.2 | 60 | 76 | 98 | 103 |
| 18,200 | 0.24 | 4 | 0.70 | 15 | 12 | 0.71 | 11 | 11 | 3.2 | 60 | 62 | 90 | 85 |

TABLE IIB.—CONTROLLED POTENTIAL REDUCTION OF NITROBENZENE AT −0.4 VOLT VS. S.C.E., 2.0 NH$_2$SO$_4$ NONALCOHOLIC SOLUTION

| Total Coulombs Passed | Unreacted Nitrobenzene | | Azoxybenzene | | | p-Aminophenol | | | Total Recovery | |
|---|---|---|---|---|---|---|---|---|---|---|
| | Grams | Percent NO$_2$ | Grams | Percent NO$_2$ | Percent Coul. | Grams | Percent NO$_2$ | Percent Coul. | Percent NO$_2$ | Percent Coul. |
| 10,990 | 2.48 | 41 | 1.35 | 28 | 36 | 1.24 | 23 | 40 | 92 | 76 |
| 17,638 | .36 | 6.0 | .79 | 16 | 13 | 2.17 | 41 | 44 | 63 | 57 |
| 19,328 | .06 | 1.0 | .66 | 14 | 10 | 2.85 | 54 | 52 | 69 | 62 |

Figure 4:
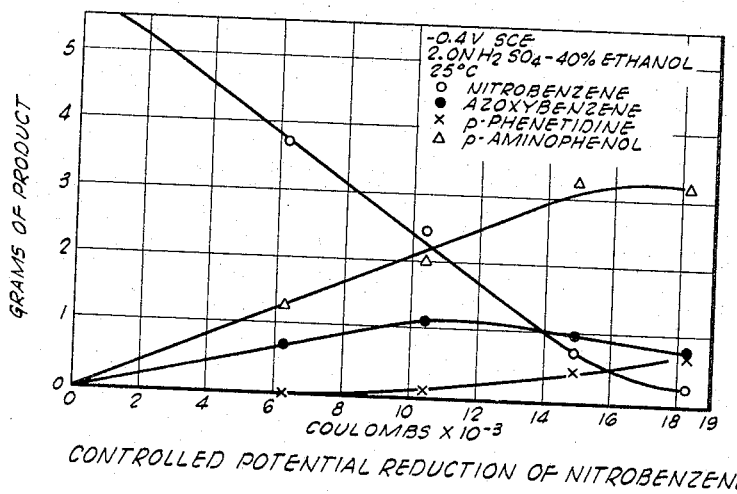

Results for the controlled potential reduction of nitrobenzene in the alcoholic electrolyte are plotted in FIG. 4 as grams of product formed versus number of coulombs passed. As indicated by the legend on the graph, the controlled cathode potential employed in the run was −0.4 volt and the temperature utilized was 25° C. (or approximately ambient temperature). It will be noted in referring to the graph that azoxybenzene is yielded in a maximum quantity after about 10,000 coulombs of current are passed. The decline in azoxybenzene yield following this time is the result of the formation of small quantities of the azobenzene and hydrazobenzene reduction products of this compound. As hereinbefore indicated, the latter products were not determined due to the small infrared absorption which characterizes these compounds.

FIG. 4 further indicates that the yield of p-aminophenol up to the passage of 14,900 coulombs rises substantially linearly with the amount of current passed, and that its conversion to p-phenetidine is slow over this period as indicated by the low and delayed yield of the latter compound.

Figure 5:
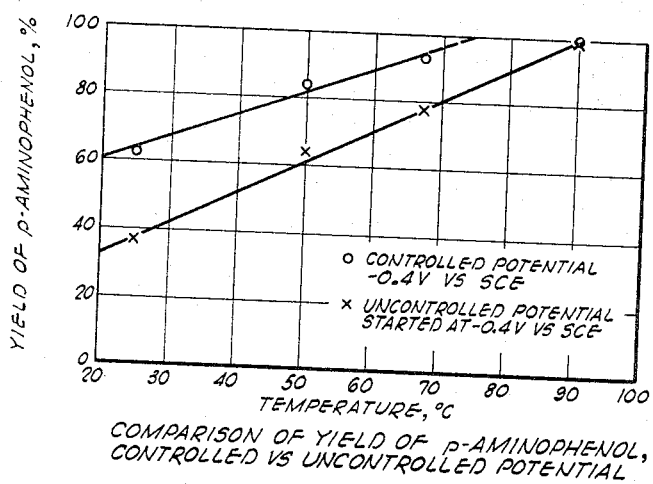
Figure 5:
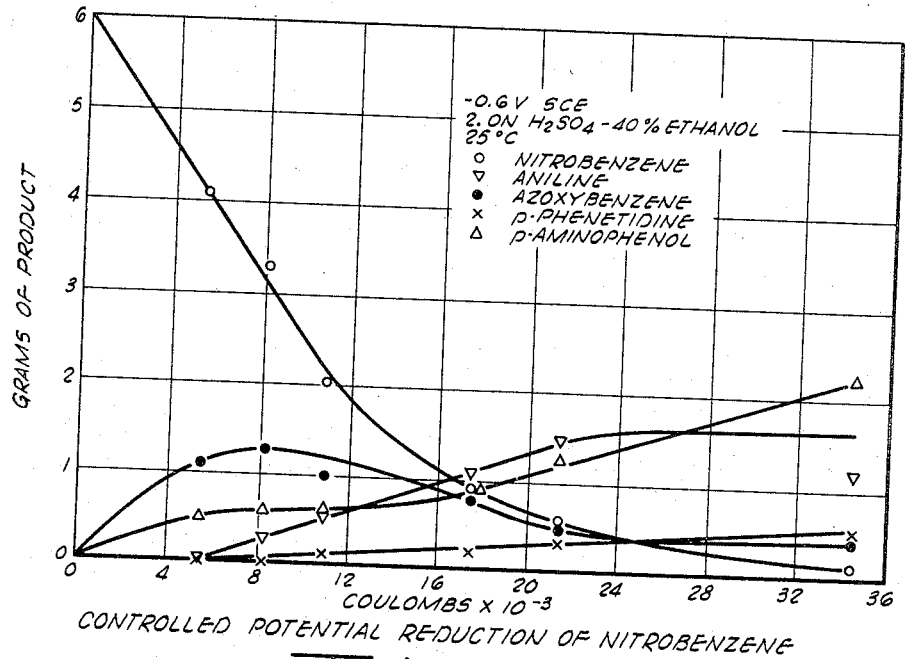
Figure 6:
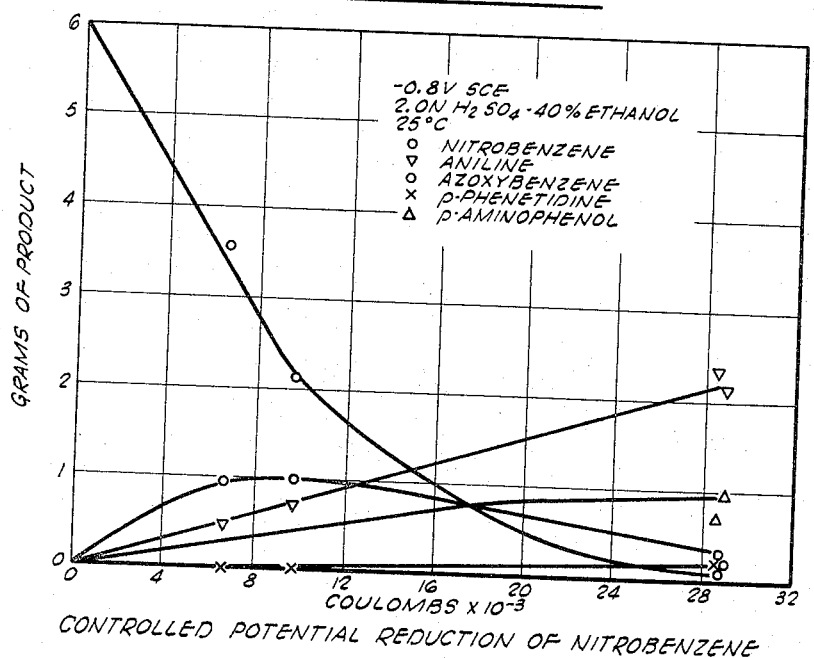
Figure 7:
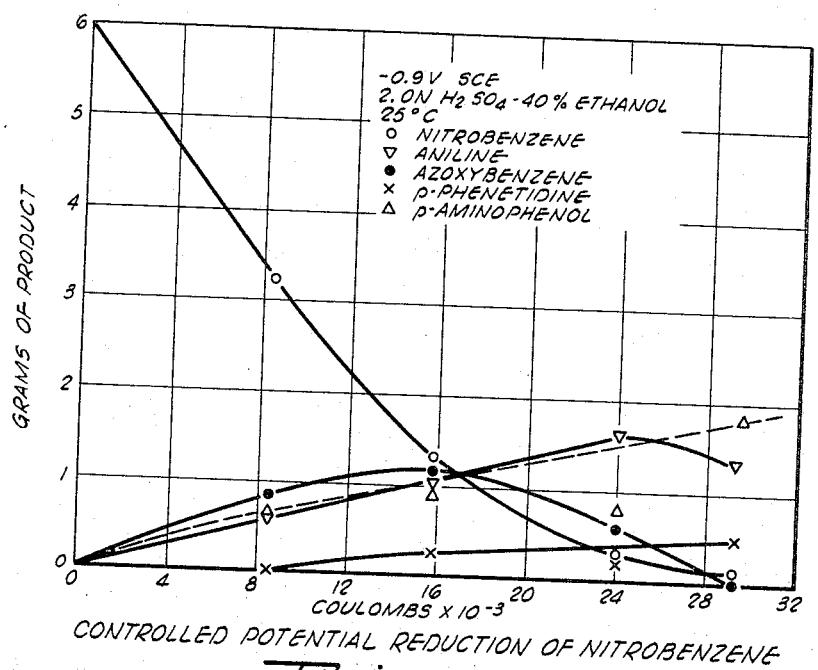

Tables III through V and FIGS. 5 through 7 show the results obtained when the cathode potential was controlled to provide a fixed potential with respect to a standard calomel half-cell of −0.6, −0.8, and −0.9 volt, respectively. The relatively low current efficiencies are due in part to the lack of detection of hydrazobenzene. However, large amounts of hydrogen gas were liberated at the cathode in the later stages of these runs, which probably accounts for some of the unproductive current. Repetition of several runs showed that the commencement of gassing was independent of potentials more cathodic than −0.6 volt and also independent of the number of coulombs passed, indicating that the gassing is caused by lowering of the hydrogen overvoltage through cathode absorption of one of the products, or by contamination of the mercury, e.g., through amalgamation of the contact wire.

TABLE III.—PRODUCTS FORMED IN CONTROLLED POTENTIAL REDUCTION OF NITROBENZENE AT −0.6 VOLT VS. S.C.E.

| Total Coulombs Passed | Unreacted Nitrobenzene | | Aniline | | | Azoxybenzene | | |
|---|---|---|---|---|---|---|---|---|
| | Grams | Percent NO$_2$ | Grams | Percent NO$_2$ | Percent Coul. | Grams | Percent NO$_2$ | Percent Coul. |
| 5,360 | 4.10 | 68 | Trace | | | 1.10 | 23 | 60 |
| 8,140 | 3.30 | 55 | 0.33 | 7 | 25 | 1.29 | 27 | 46 |
| 10,930 | 2.05 | 34 | 0.56 | 12 | 32 | 1.01 | 21 | 27 |
| 17,280 | 0.95 | 16 | 1.10 | 24 | 40 | 0.85 | 18 | 14 |
| 21,190 | 0.54 | 9 | 1.37 | 30 | 40 | 0.47 | 10 | 7 |
| 34,580 | 0.14 | 2 | 1.12 | 25 | 20 | 0.43 | 9 | 4 |

| Total Coulombs Passed | p-Phenetidine | | | p-Aminophenol | | | Total Recovery, Percent | |
|---|---|---|---|---|---|---|---|---|
| | Gram | Percent NO$_2$ | Percent Coul. | Grams | Percent NO$_2$ | Percent Coul. | NO$_2$ | Coul. |
| 5,360 | Absent | | | 0.52 | 10 | 34 | 101 | 94 |
| 8,140 | Trace | | | 0.57 | 11 | 25 | 100 | 96 |
| 10,930 | 0.14 | 2 | 4 | 0.64 | 12 | 21 | 81 | 84 |
| 17,280 | 0.19 | 3 | 3 | 0.90 | 17 | 19 | 78 | 76 |
| 21,190 | 0.34 | 5 | 5 | 1.22 | 23 | 20 | 75 | 72 |
| 34,580 | 0.52 | 8 | 4 | 2.19 | 41 | 22 | 84 | 50 |

TABLE IV.—PRODUCTS FORMED IN CONTROLLED POTENTIAL REDUCTION OF NITROBENZENE AT −0.8 VOLT VS. S.C.E.

| Total Coulombs Passed | Unreacted Nitrobenzene | | Aniline | | | Azoxybenzene | | |
|---|---|---|---|---|---|---|---|---|
| | Grams | Percent NO₂ | Grams | Percent NO₂ | Percent Coul. | Grams | Percent NO₂ | Percent Coul. |
| 6,700 | 3.55 | 59 | 0.45 | 10 | 42 | 0.89 | 18 | 39 |
| 9,600 | 2.15 | 36 | 0.72 | 16 | 46 | 0.92 | 19 | 28 |
| 28,500 | 0.09 | 2 | 2.33 | 51 | 51 | 0.23 | 5 | 2 |
| 28,700 | 0.17 | 3 | 2.15 | 47 | 47 | 0.20 | 4 | 2 |

| Total Coulombs Passed | p-Phenetidine | | | p-Aminophenol | | | Total Recovery, Percent | |
|---|---|---|---|---|---|---|---|---|
| | Gram | Percent NO₂ | Percent Coul. | Grams | Percent NO₂ | Percent Coul. | NO₂ | Coul. |
| 6,700 | | | | 0.28 | 5 | 15 | 92 | 96 |
| 9,600 | | | | 0.42 | 8 | 15 | 79 | 89 |
| 28,500 | 0.21 | 3 | 2 | 0.68 | 13 | 9 | 74 | 64 |
| 28,700 | 0.20 | 3 | 2 | 0.97 | 18 | 12 | 75 | 63 |

TABLE V.—PRODUCTS FORMED IN CONTROLLED POTENTIAL REDUCTION OF NITROBENZENE AT −0.9 VOLT VS. S.C.E.

| Total Coulombs Passed | Unreacted Nitrobenzene | | Aniline | | | Azoxybenzene | | |
|---|---|---|---|---|---|---|---|---|
| | Grams | Percent NO₂ | Grams | Percent NO₂ | Percent Coul. | Grams | Percent NO₂ | Percent Coul. |
| 8,390 | 3.22 | 54 | 0.56 | 12 | 41 | 0.73 | 15 | 26 |
| 15,860 | 1.32 | 22 | 1.01 | 22 | 39 | 0.95 | 20 | 18 |
| 23,920 | 0.32 | 5 | 1.54 | 34 | 40 | 0.51 | 11 | 6 |
| 29,100 | 0.14 | 2 | 1.40 | 31 | 30 | Trace | | |

| Total Coulombs Passed | p-Phenetidine | | | p-Aminophenol | | | Total Recovery, Percent | |
|---|---|---|---|---|---|---|---|---|
| | Gram | Percent NO₂ | Percent Coul. | Grams | Percent NO₂ | Percent Coul. | NO₂ | Coul. |
| 8,390 | | | | 0.65 | 12 | 28 | 93 | 95 |
| 15,860 | 0.29 | 4 | 5 | 0.94 | 18 | 21 | 86 | 83 |
| 23,920 | 0.21 | 3 | 2 | 0.79 | 15 | 12 | 68 | 60 |
| 29,100 | 0.53 | 8 | 5 | 1.84 | 35 | 22 | 76 | 57 |

The major feature of the electrolysis runs represented by the data presented in Tables III through V is that p-aminophenol is a major product at −0.4 volt with aniline completely absent, while at higher potentials, significant amounts of aniline are formed and the amount of p-aminophenol is substantially reduced. It thus becomes apparent that product selectivity may be controlled by controlling the cathode potential. In other words, one product may be made to predominate and another product suppressed by selective control of the cathode potential.

As a further study of the effect of controlling the cathode potential upon the types of reduction products produced in the cathodic reduction of nitrobenzene, and to provide a comparison of controlled potential reduction with uncontrolled potential reduction, electrolyses were carried out utilizing a constant current source and adjusting the current density so that the initial cathode potentials in three uncontrolled potential runs were −0.4, −0.6, and −0.9 volt, respectively. Table VI shows the yields of various products for uncontrolled potential runs which were begun at −0.4, −0.6, and −0.9 volt. Very low product and current yields were observed in these and all other uncontrolled potential runs made at room temperature. In all cases, the potentials became more negative as the electrolyses progressed. The low product yield was attributed to the formation of azoxybenzene and hydrazobenzene which were not determined in the analyses since neither of these compounds is absorbed to a sufficient degree in the IR range and, moreover, these spectra overlap with that of azoxybenzene. These two compounds probably account for most of the missing current, and any remainder presumably was used in hydrogen evolution.

TABLE VI.—PRODUCTS FORMED IN UNCONTROLLED POTENTIAL REDUCTION OF NITROBENZENE

| Component | Init. Pot. = −0.4 Volt | | | Init. Pot. = −0.6 Volt | | | Init. Pot. = −0.9 Volt | | |
|---|---|---|---|---|---|---|---|---|---|
| | Grams | Percent NO₂ | Percent Coul. | Grams | Percent NO₂ | Percent Coul. | Grams | Percent NO₂ | Percent Coul. |
| Unreacted nitrobenzene | 0.04 | 1 | | 0.38 | 6 | | 0.12 | 2 | |
| Aniline | 2.07 | 46 | 46 | 1.83 | 40 | 30 | 1.92 | 42 | 27 |
| Azoxybenzene | 0.15 | 3 | 2 | 0.17 | 4 | 1 | Trace | | |
| p-Phenetidine | *Absent | | | 0.13 | 2 | 1 | 0.05 | 1 | 0 |
| p-Aminophenol | 1.29 | 24 | 16 | 0.69 | 13 | 6 | 1.29 | 24 | 10 |
| Total recovery | | 74 | 64 | | 65 | 38 | | 69 | 37 |

*This run carried out in 2 N H₂SO₄, with no alcohol present, so p-phenetidine could not be formed.
For initial potential = −0.4 volt vs. S.C.E., 28,230 coulombs passed; −0.6 vol., 37,680 coulombs passed; −0.9 volt, 44,734 coulombs passed.

In a further examination of the effect of employing controlled versus uncontrolled cathode potential in the electrolytic reduction of nitrobenzene, a series of electrolysis runs were carried out at an initial potential of −0.4 volt to determine the effect of other variables on the yield of p-aminophenol, both when the potential was controlled and retained throughout the run at −0.4 volt, and also when the potential was uncontrolled. These runs indicated that an increase in the concentration of the acid had little effect upon the yield of p-aminophenol. The effect of temperature variation was more striking. As illustrated in FIG. 9, which is a comparison of controlled and uncontrolled potential electrolyses as a function of temperature, at a sufficiently high temperature (above about 90° C.), the irreversible rearrangement of phenylhydroxylamine to form p-aminophenol is so rapid that this compound is formed in 100 percent yield even though the cathode potential is not controlled. It thus becomes apparent that at elevated temperatures, even though the cathode potential is not controlled, p-aminophenol can be produced in excellent yield. However, from the standpoint of the economics of commercial preparation, the value of controlled cathode potential becomes manifest when it is observed that approximately twice the yield of p-aminophenol can be obtained at ambient temperatures when a controlled potential electrolysis is employed. The extent to which the control of potential at these lower temperatures influences the total yield of p-aminophenol will next be discussed.

As has been hereinbefore indicated, the electronic control instrumentation hereinbefore described is capable of delivering relatively high currents at a voltage control of ±1 millivolt over a wide range of voltage which is sufficient to permit substantially any electrochemical reaction to be carried out. In an effort to determine the extent to which fine potential control of this type influences the yield of p-aminophenol produced by electrolytic reduction of nitrobenzene, a series of tests were conducted in which the optimum cathode potential of −0.385 volt was varied by different amounts from the optimum controlled potential in the course of an electrolysis run. The variation in yield corresponding to these departures of the controlled potential from the optimum value was measured for the purpose of determining the extent to which p-aminophenol yield was dependent upon precision of potential control. During these runs the temperature of the electrolyte was maintained at 25° C. The values which were determined by these runs are set forth in Table VII.

TABLE VII

| Precision of potential control, in millivolts: | Yield variation, percent weight |
|---|---|
| 100 | 31 |
| 50 | 21 |
| 10 | 6 |
| 5 | 3 |
| 1 | 1 |

It will be noted that precise potential control is extremely important in obtaining the maximum yield of p-aminophenol and, presumably, other potential dependent reduction products. The value of the electronic control instrumentation in electrolytic reductions where a plurality of potential dependent products may be formed is thus clearly evident.

It is further evident that in the case of the present invention, a method and apparatus have been provided whereby the products of electrolytic oxidation or reduction reactions may, in many cases, and specifically in the case of the p-aminophenol product produced by the reduction of nitrobenzene, be produced in commercial quantities on an economical basis. The potential control apparatus of the present invention is capable of delivering up to 10,000 amperes over a wide potential range with a potential control of ±1 millivolt. With this power output and potential control, 500,000 pounds of the p-aminophenol reduction product may easily be produced per year, which rate of production is sufficient to render the production of this material by electrolytic reduction commercially feasible.

The economics of the electrolytic reduction is further improved by the ability to obtain relatively good yields at ambient temperatures when the potential is precisely controlled at the optimum cathode potential value. Moreover, the slight increases in acid concentration have been demonstrated to effect some improvement in p-aminophenol yield so that, in summary, the most economical conditions for the electrolytic reduction of p-aminophenol by reduction of nitrobenzene using controlled cathode potential have been illustrated to be those obtaining when a controlled cathode potential of −0.385 volt ±1 millivolt is employed, an acid concentration of from about 2 N to about 4 N sulfuric acid is used, ambient temperatures in the vicinity of 25° C. are used, and a total current of from about 14,000 to 18,000 coulombs per 6 grams of nitrobenzene subjected to reduction is employed.

The process and apparatus of this invention find application broadly in the electrochemical conversion of organic compounds by oxidation and reduction. Thus, the method and system of the invention may be applicable to the conversion of hydrocarbons and substituted hydrocarbon compounds, in general, containing reactive substituents or groups which are incapable of being oxidized or reduced in the conventional electrochemical systems. The hydrocarbon portion of the organic compounds may be alkyl, cycloalkyl, alkenyl, alkynyl, aryl, alkaryl, aralkyl and the like. Illustrative of non-hydrocarbon constituents which can be present in the organic compound are the following:

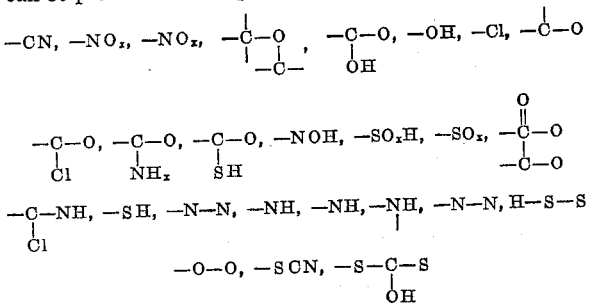

and the like. The organic compounds can also contain nonhydrocarbon substituents or groups which are nonoxidizable and nonreducible.

Specific illustrative examples of reduction reactions which can be carried out include the reduction of nitrobenzene to phenylhydroxylamine, p-aminophenol, p-phenetidine, or aniline, reduction of methyl benzalaniline to methyl benzylaniline, reduction of ethyl acetimidate to ethylamine, desulphonation of saccharin to benzamide, dehalogenation of carbon tetrachloride to chloroform or di-chloromethane, dehalogenation of trichloroacetic acid to di-chloro- or monochloroacetic acid, reduction of isobutyraldehyde to isobutane, isobutene, or isobutyl alcohol, reduction of formaldehyde to methyl alcohol, reduction of glyoxylic acid to tartaric acid or succinic acid, reduction of acetone to pinocol or isopropyl alcohol, reduction of the methyl ester of alpha-bromoacetic acid to the dimethyl ester of dithiodiglycolic acid, reduction of homocystine to homocysteine, reduction of 4-aminophenylarsenic acid to 4-aminophenylarsine or p-arseno-aniline, reduction of p-toluene-sulphonyl chloride to p-toluene sulphinic acid, or the corresponding mercaptan, reduction of phenylacetic acid to the corresponding alcohol, reduction of oxalic acid to glyoxylic acid, reduction of m-bromobenzoic acid to m-bromobenzyl alcohol, reduction of an alkaloid such as pegan to yield an o-aminobenzyl-pyrrolidine, hydrogenation of crotonic acid to butyric acid, hydrogenation of 2-methyl - 3 - butyne - 2 - ol to dimethylvinyl-carbinol, reduction of N - methyl - alpha - phenyl - acetamide to N-methyl-beta-phenylethylamine and the like.

Illustrative examples of anodic oxidation reactions within the scope of the invention include, for example, normal butyric acid to propyl butyrate, isopropyl butyrate, isopropyl alcohol, hexane and carbon dioxide; potassium cyclohexanecarboxylate to cyclohexanol; sodium acrylate to acetone and acrylic acid; benzoic acid to benzene and its diethylamine salt; lactic acid to acetic acid; o-tolunitrile to o-cyanobenzoic acid; m-xylene to azo-m-xylene; o-toluene sulphonic acid to hydroxylated carboxylic-sulphonic acid, or 3,4-dihydroxy-6-sulphobenzoic acid or mesaconic acid; the acetoxylation of monophenyl acetic acid to monophenyl acetate; the acetoxylation of anisole to o- and p-acetoxyanisoles; the oxidation of benzaldehyde to benzoic acid; the oxidation of isopropyl alcohol to acetone; the oxidation of tropine to tropinone; the oxidation of benzene to phenol; the oxidation of toluene to benzaldehyde; the oxidation of chlorobenzene to p-chlorophenol, quinone or succinic acid; the oxidation of ethylbenzene to methyl phenol carbinol; the oxidation of naphthalene to alphanaphthol; the oxidation of acetaldehyde to acetic acid; the oxidation of acetone to acetic and forming acids; the oxidation of glucose to arabinose and saccharic acid; the oxidation of furfuraldehyde to maleic acid; the oxidation of piperidine to gamma-amino-valeric acid; the oxidation of ammonium acetate to urea; the oxidation of ethyl thiocyanate to ethyl sulphonic acid and the like.

A number of other oxidation and reduction reactions involving organic compounds and subject to the application of the present invention will be apparent to those skilled in the art, and in this regard reference is made to the publications "Organic Electrode Processes" by M. J. Allen, Reinhold Publishing Corporation, New York, 1958, and "Organic Electrochemistry," F. Fichter, Dresden and Leipzig, 1942. It is intended that the teachings of these publications with respect to the conditions under which a controlled variation of potential may be beneficially applied shall be incorporated in this application by reference.

An essential feature of the invention is the maintenance of a predetermined potential between the standard electrode and the cathode or anode, depending upon the type of electrochemical reaction which is occurring. In continuous processes, the electrode potential will be maintained constant and at a value which provides the desired reaction product. In batch processes wherein the quantity of material to be converted varies with time, it often is necessary to periodically adjust the value of the potential, according to a set program, to compensate for the continuous change in reactant concentration. Usually the potential will be controlled in a range from about 0.001 to about 1.7 volts, the latter voltage being the level at which water decomposes at atmospheric pressure. Higher potentials can be employed when superatmospheric pressures are used. The controlled potential is substantially less than the impressed voltage which is applied across the anode and cathode, and which can vary from about 1 to about 100 volts or higher.

An important factor in electrochemical reactions is the current density, which establishes both the rate of conversion and the yields which can be obtained. It is contemplated within the scope of this invention to employ current densities varying from about 1 milliampere per square centimeter to about 100 amperes per square centimeter and preferably from about 30 milliamperes per square centimeter to about 10 amperes per square centimeter.

From the foregoing description of the invention, it will be apparent that the present invention provides a highly useful instrument for delivering high currents while precisely controlling the cathode potential of an electrolytic reduction cell with respect to a reference electrode. The instrument may be used to increase the selectively, and therefore the yield, of a particular electrolytic reduction or oxidation product where a plurality of such products are formed and are, in each case, potential dependent. Moreover, certain optimum conditions of cathode potential, temperature, electrolyte (particularly, acid concentration) and current passage (or time of electrolysis) have been evaluated for the production of p-aninophenol by the electrolytic reduction of nitrobenzene using the potential control apparatus of the present invention. The method and apparatus herein described for the first time make commercially feasible the production of p-aminophenol by an electrolytic process in which nitrobenzene is reduced at a cathode of controlled potential.

Although a number of modifications and innovations which may be made in the procedures and apparatus hereinbefore described will occur to those skilled in the art, many of these modifications and innovations will not involve a departure from the basic principles upon which the invention is based. It is therefore intended that insofar as all changes of structure, process conditions and order of performing the steps of the process do not depart from the basic principles underlying the invention, such changes are deemed to be circumscribed by the spirit and scope of the invention except as the same may be necessarily limited by the appended claims or reasonable equivalents thereof.

I claim:

1. A process for the preparation of p-aminophenol in an electrolytic cell having a mercury cathode, a platinum anode and a porous member separating said cathode and anode comprising:
    (a) placing an alcoholic-mineral acid-aqueous electrolyte in said cell on the cathode side of said porous member;
    (b) placing a standard half-cell in electrical communication with said electrolyte at a point in juxtaposition to said cathode;
    (c) dissolving nitrobenzene in said electrolyte solution on the cathode side of said porous member;
    (d) passing an electric current through said cell from said cathode to said anode until about 14,900 coulombs per 6 grams of nitrobenzene have been passed;
    (e) maintaining a voltage on said cathode with reference to said standard half-cell within 1 millivolt of a constant value within a range of from about −0.35 volt to about −0.40 volt; and
    (f) recovering p-aminophenol from said electrolytic cell.

2. The process claimed in claim 1 wherein said electrolyte comprises a solution of about 40 percent by weight ethanol in about 60 percent by weight of an aqueous sulfuric acid solution having a normality of from about 2 to about 4.

3. In a process for the preparation of p-aminophenol in an electrolytic cell having a mercury cathode, a platinum anode and a porous member separating said cathode and anode, the steps comprising:
    (a) placing an electrolyte solution consisting of about 60 percent by weight of from about 2 normal to about 4 normal $H_2SO_4$ and about 40 percent by weight ethanol in said cell;
    (b) maintaining the temperature of the cell above about 90° C.;
    (c) placing a standard half-cell junction in said solution in proximity to said cathode;
    (d) dissolving nitrobenzene in said electrolyte solution on the cathode side of said porous member;
    (e) passing an electric current through said cell from said cathode to said anode and imposing an initial voltage of about −0.4 volt on said cathode with reference to said standard half-cell; and
    (f) recovering p-aminophenol from said electrolytic cell.

4. A process for the preparation of p-aminophenol by electrolytically reducing nitrobenzene in an electrolytic cell having a mercury cathode and a platinum anode comprising:
    (a) placing an acidic electrolyte in the cell;

(b) placing a standard half-cell in communication with the electrolyte at a point adjacent the mercury cathode;
(c) placing the nitrobenzene to be reduced in the electrolyte;
(d) impressing a potential in the range of from about 10 to about 100 volts across the cathode an anode;
(e) passing an electric current exceeding 75 amperes through the cell from the cathode to the anode; and
(f) regulating the electrical current passed through the cell to maintain within ±1 millivolt, a constant, predetermined potential of −0.385 volt between said cathode and said standard half-cell while maintaining said electrolyte at a temperature of about 25° C. during the passage of the current through said cell; and
(g) recovering p-aminophenol from said electrolytic cell.

5. The method claimed in claim 4 wherein at least 14,000 coulombs of current are passed through the cell for each 6 grams of nitrobenzene in the cell.

References Cited
UNITED STATES PATENTS 2,584,816  2/1952  Sands _____ 204—231
2,835,631  5/1958  Metcalf et al. _____ 204—74

OTHER REFERENCES

Allen, M. J.: Organic Electrode Processes, 1948, pages 20–28, 31, 42 and 49–55.

Solanki: Influence of Structure and Strain in a Metal Cathode on the Eelectrolytic Reduction of Nitrobenzene, J. Electrochemical Society, vol. 88, 1945, page 97.

JOHN H. MACK, *Primary Examiner.*

H. M. FLOURNOY, *Assistant Examiner.*